US012724615B2

(12) United States Patent
Li et al.

(10) Patent No.: US 12,724,615 B2
(45) Date of Patent: Sep. 1, 2026

(54) GRANULAR SOURCE READ SCHEDULING FOR INSTRUCTION EXECUTION

(71) Applicant: Apple Inc., Cupertino, CA (US)

(72) Inventors: David K. Li, Austin, TX (US); Ana Lucia Rescala Loper, Austin, TX (US); Arun Bansal, Austin, TX (US); Chance C. Coats, Austin, TX (US); Zeran Zhu, Austin, TX (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 18/911,522

(22) Filed: Oct. 10, 2024

(65) Prior Publication Data

US 2026/0079715 A1 Mar. 19, 2026

Related U.S. Application Data

(60) Provisional application No. 63/696,562, filed on Sep. 19, 2024.

(51) Int. Cl.
*G06F 9/38* (2018.01)
*G06F 9/50* (2006.01)

(52) U.S. Cl.
CPC .......... *G06F 9/3888* (2023.08); *G06F 9/3836* (2013.01); *G06F 9/5022* (2013.01)

(58) Field of Classification Search
CPC .................................................... G06F 9/3888
See application file for complete search history.

(56) References Cited

U.S. PATENT DOCUMENTS

| | | | |
|---|---|---|---|
| 5,974,438 | A | 10/1999 | Neufeld |
| 6,105,051 | A | 8/2000 | Borkenhagen et al. |
| 6,145,054 | A | 11/2000 | Mehrotra et al. |
| 7,237,093 | B1 | 6/2007 | Musoll et al. |
| 7,418,576 | B1 | 8/2008 | Lindholm et al. |
| 7,478,388 | B1 | 1/2009 | Chen et al. |

(Continued)

FOREIGN PATENT DOCUMENTS

| | | | |
|---|---|---|---|
| WO | 2008061154 | A3 | 9/2008 |
| WO | 2013098643 | A2 | 7/2013 |

*Primary Examiner* — Michael J Metzger
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to accessing source data in single-instruction multiple-thread (SIMT) pipelines. In some embodiments, multiple categories of operand resource circuits are configured to provide operands for instructions executed by processor pipeline circuitry. Per-resource arbitration circuitry may arbitrate between the SIMT execution slots for access to different operand resources. Source access circuitry may access operand data from operand resources based on source capture commands and source control circuitry may prior to a first SIMT group winning arbitration for all its operands, send a source capture command to the source access circuitry in response to the first SIMT group winning arbitration at the per-resource arbitration circuitry for a first operand resource. Instruction control circuitry may send an instruction release command down the processor pipeline circuitry for the first SIMT group, in response to the first SIMT group winning arbitration for all its operands.

20 Claims, 9 Drawing Sheets

(56) References Cited

U.S. PATENT DOCUMENTS 7,895,415 B2 2/2011 Gonzalez
8,095,778 B1 1/2012 Golla
8,533,719 B2 9/2013 Fedorova
10,027,587 B1 7/2018 O'Brien et al.
10,089,114 B2 10/2018 Kulkarni et al.
10,585,670 B2 3/2020 Abdallah
10,642,618 B1 5/2020 Hakewill
11,301,298 B2 4/2022 Varma
11,314,562 B2 4/2022 Dice
2004/0059896 A1 3/2004 Kossman et al.
2004/0060052 A1 3/2004 Brown et al.
2005/0114856 A1 5/2005 Eickemeyer et al.
2005/0210158 A1 9/2005 Cowperthwaite et al.
2006/0179280 A1 8/2006 Jensen et al.
2007/0103476 A1 5/2007 Huang et al.
2007/0143582 A1 6/2007 Coon et al.
2009/0210677 A1 8/2009 Luick
2010/0083267 A1 4/2010 Adachi et al.
2011/0276784 A1 11/2011 Gewirtz et al.
2012/0079503 A1 3/2012 Dally et al.
2013/0166881 A1 6/2013 Choquette et al.
2014/0160126 A1 6/2014 Legakis et al.
2014/0282566 A1 9/2014 Lindholm
2015/0046684 A1 2/2015 Mehrara et al.
2016/0246728 A1 8/2016 Ron et al.
2016/0292814 A1 10/2016 Holland
2018/0046577 A1 2/2018 Chen et al.
2018/0181491 A1 6/2018 DeLaurier et al.
2019/0018676 A1 1/2019 Alexander
2019/0340019 A1 11/2019 Brewer
2019/0370059 A1 12/2019 Puthoor et al.
2020/0043123 A1 2/2020 Dash
2020/0293450 A1 9/2020 Vemulapalli et al.
2021/0073450 A1 3/2021 Boesch
2021/0326139 A1* 10/2021 Gupta .................. G06F 9/3861
2021/0342158 A1 11/2021 Brewer
2021/0382717 A1* 12/2021 Jiang .................. G06F 9/30087
2022/0043413 A1 2/2022 Heydari
2022/0091657 A1 3/2022 Tsien
2022/0100484 A1 3/2022 Abu-Ghazaleh et al.
2022/0206876 A1 6/2022 Beckmann et al.
2023/0367676 A1 11/2023 Jeyapaul et al.
2023/0401132 A1 12/2023 Patle et al.
2024/0419447 A1* 12/2024 Chaudhari ................ G06T 1/20

* cited by examiner

GRANULAR SOURCE READ SCHEDULING FOR INSTRUCTION EXECUTION

The present application claims priority to U.S. Provisional App. No. 63/696,562, entitled "Granular Source Read Scheduling for Instruction Execution," filed Sep. 19, 2024, the disclosure of which is incorporated by reference herein in its entirety.

BACKGROUND

Technical Field

This disclosure relates generally to computer processors and more particularly to instruction scheduling and obtaining source operands.

Description of Related Art

In certain processor architectures, accesses to source operands may cause pipeline bottlenecks. For example, single-instruction multiple-thread (SIMT) pipelines such as used in graphics processors may implement multiple SIMT slots per pipeline which may arbitrate for source operands from various resources (e.g., operand caches, register files, data caches, etc.). Different resources may implement different numbers of banks/ports. Traditionally, instructions were released past a certain pipeline stage only after they won arbitration to access source resources for all their source operands.

DETAILED DESCRIPTION

Computer processors execute various types of instructions, many of which operate on one or more source operands to produce a result. When an instruction needs multiple source operands, traditionally the pipeline might hold the instruction until all its operands are available, before scheduling or issuing the instruction down the pipeline for further processing. In contrast, in disclosed embodiments, when an instruction wins arbitration for one of its operands, control circuitry may send a command down the pipeline to retrieve that operand, even while the instruction is still waiting in arbitration for other source operands.

For example, per-resource arbitration circuitry may arbitrate among multiple SIMT slots that are requesting a given source resource. In some embodiments this may include separate arbitration circuitry for an operand cache, for a low-level data cache, for a register file, etc. (or for portions of these components, e.g., read ports, banks, etc.). When an instruction wins arbitration for one of its sources, source capture circuitry sends a source capture command to downstream source access stages, (potentially prior to the instruction winning arbitration for all of its resources). Instruction tracker circuitry tracks instructions and sends an instruction release command when an instruction wins arbitration for all its resources. This greedy, granular scheduling may advantageously improve instruction throughput by providing more efficient use of pipeline circuitry. Disclosed techniques may also reduce power consumption for a given workload and provide timing advantages within certain pipeline stages.

In some embodiments, multiple instructions are buffered for arbitration per SIMT slot, which may increase the likelihood of a requester being in a position to acquire its source data when a source resource is available. In these embodiments, landing space circuitry may provide space to store accessed operands from multiple instructions per SIMT slot. These embodiments may also implement multi-stage arbitration, first within a SIMT slot and then among SIMT slots.

Graphics Processing Overview

Figure 1A:
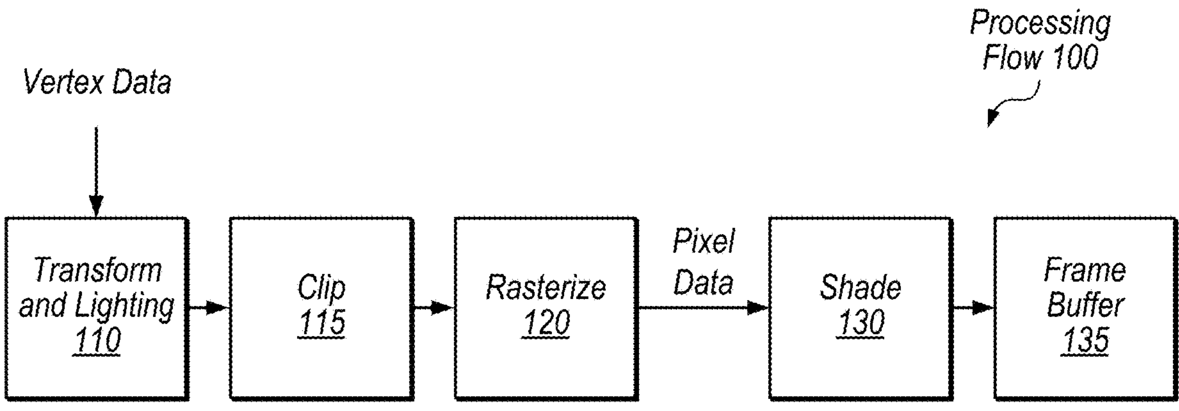
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
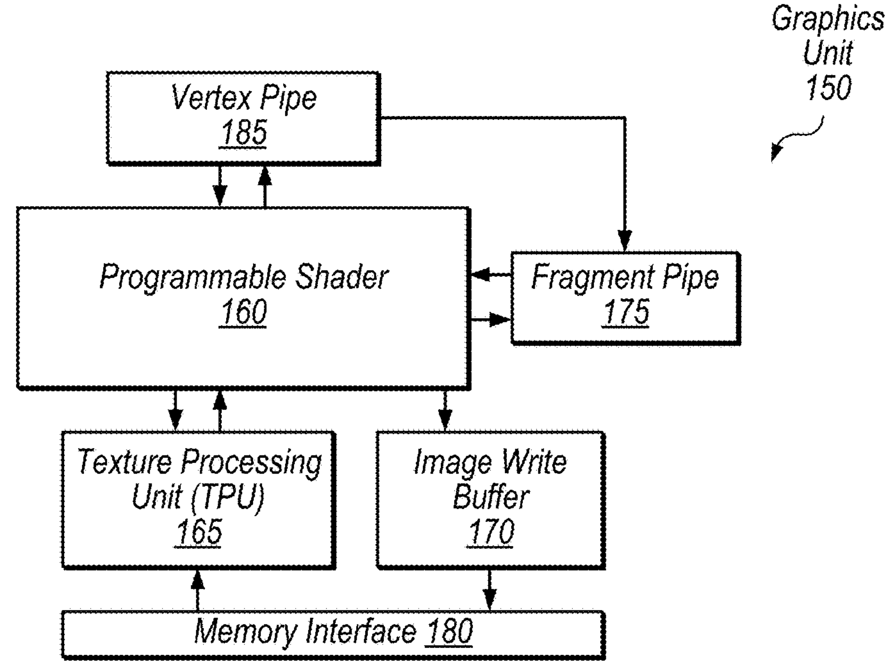
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Granular Read Scheduling

Figure 2:
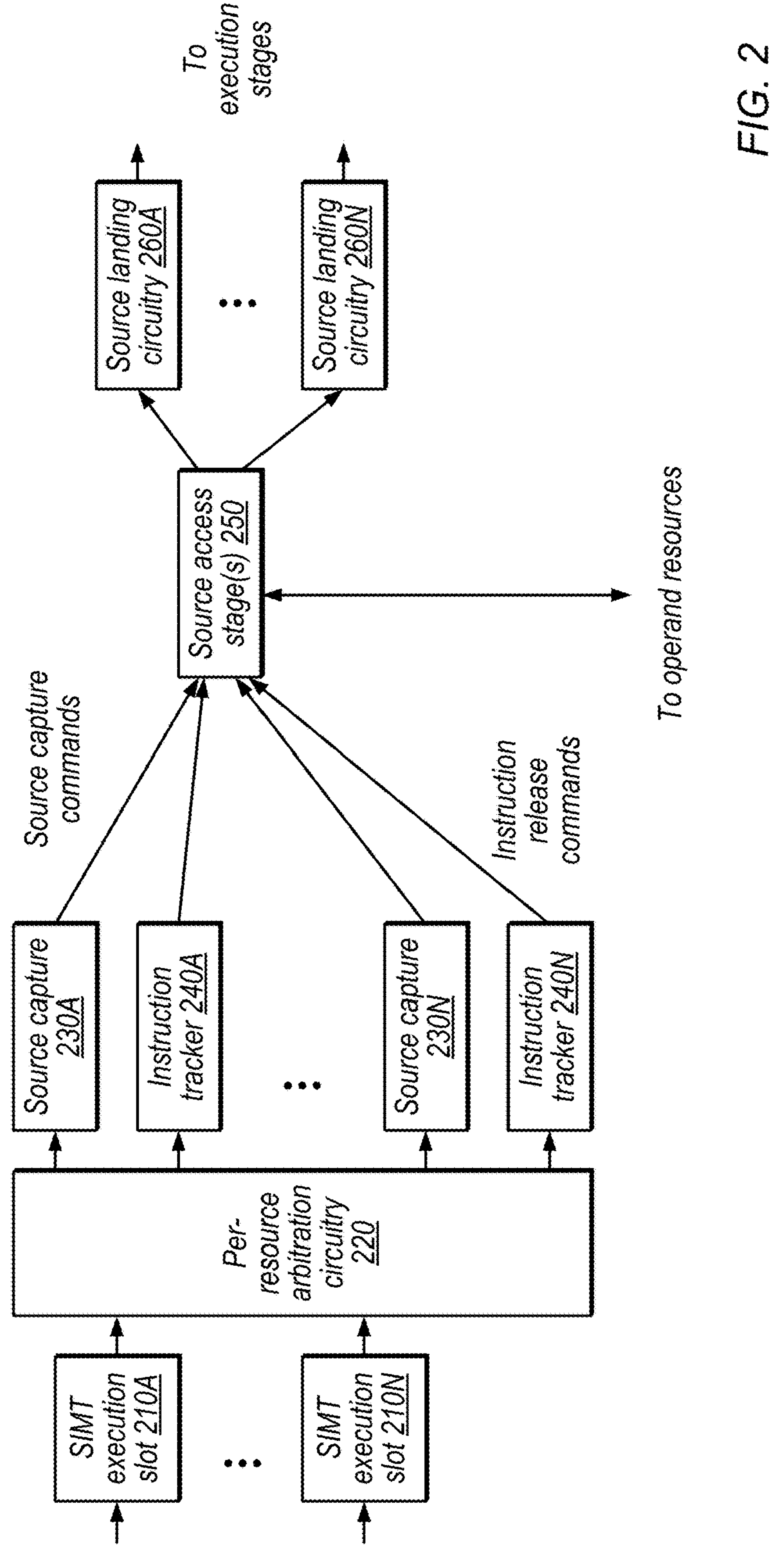
FIG. 2 is a block diagram illustrating an example pipeline configured to send individual source capture commands prior to an instruction winning arbitration for all its operands, according to some embodiments.

FIG. 2 is a block diagram illustrating an example pipeline that implements granular read scheduling, according to some embodiments. In the illustrated example, the pipeline includes SIMT execution slots 210A-210N, per-resource arbitration circuitry 220, source capture circuitry 230A-230N, instruction tracker circuitry 240A-240N, source access stage(s) 250, and source landing circuitry 260A-260N.

A given SIMT execution slot 210, in some embodiments, is configured to queue operand requests for a SIMT group. Each thread in the SIMT group may access the same type of source operand for a given instruction, but access a thread-specific version of that operand (e.g., each thread may have its own version of a given general-purpose register). Source operands may be sourced from various resources, e.g., as forwarded results from prior instructions, from an operand cache, from a register file, from a data cache at a certain level in a cache/memory hierarchy, etc. In some embodiments, different threads in the same SIMT group may access different source resources (e.g., some threads may hit in a data cache at a certain level and some may not). Example resources are discussed in more detail below with reference to FIG. 3. One or more of these resources may support up to a given number of reads in a given cycle, which may be less than the number of execution slots 210. Therefore, slots may request access to a given source resource (e.g., based on tag hit results or otherwise determining the appropriate resource) and wait for that resource to become available.

Per-resource arbitration circuitry 220, in some embodiments, includes arbitration circuitry per source resource and is configured to arbitrate among requests by the execution slots 210. For a type of resource that can handle multiple accesses per cycle (e.g., resources with multiple read ports), circuitry 220 may include an arbiter configured to select multiple requests (e.g., M requests selected in a given cycle from N valid requests) or may include a separate arbiter per access opportunity (e.g., per port or per bank). Arbitration circuitry 220 may implement various arbitration techniques based on various inputs, such as SIMT group priorities, age information (e.g., for a given request or a given slot), round-robin tracking, etc.

Source capture circuitry 230, in some embodiments, is configured to, for a given slot, send a source capture command when that slot wins arbitration for a given source. These source capture commands are at source granularity, e.g., such that one source of an instruction may win arbitration and source capture circuitry 230 may send a corresponding source capture command while one or more other sources are still waiting to win arbitration. The source capture commands may cause a read of the source at one or more pipeline stages (e.g., source access stage(s) 250) and the source data may be captured in source landing circuitry 260 for the appropriate slot. The source access stage(s) may provide appropriate requests or control signaling to access the particular resource circuitry. Landing circuitry 260 may buffer source information for use by execution stages. The execution stages may operate on the source data to generate an instruction result, e.g., for storage at a specified destination location.

Instruction tracker circuitry 240, in some embodiments for a given slot, tracks when all sources from the slot have sent source capture commands. In response to all sources wining arbitration for the instruction, circuitry 240 is configured to send an instruction release command and the instruction is allowed to proceed down the pipeline. Circuitry 240 may send the instruction release command for a given instruction in the same cycle as the last source capture command for that instruction or in a subsequent cycle. When all sources have been retrieved to source landing circuitry 260, control circuity may issue the instruction to the execution stages. Note that various other pipeline stages, e.g., between circuitry 220 and 260 may be included, in some embodiments; the illustrated stages are included for purposes of illustration, but not intended to limit the scope of the present disclosure.

Note that the per-resource arbitration by circuitry 220 may be separate from scheduling arbitration that assigns SIMT groups to execution slots 210. Therefore, some embodiments may implement multiple stages of arbitration, e.g., to first assign SIMT groups to execution slots and then to assign source resources to instructions. Further, a given pipeline may also implement other types of scheduling/arbitration, such as arbitration to utilize specific types of execution units (e.g., floating-point, integer, load/store units, etc.).

Figure 3:
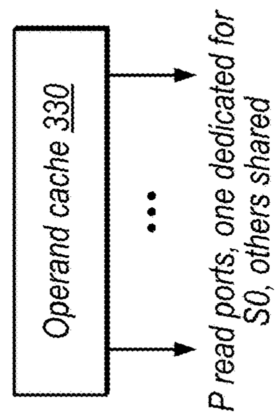
FIG. 3 is a block diagram illustrating different example operand resources, according to some embodiments.
Figure 3:
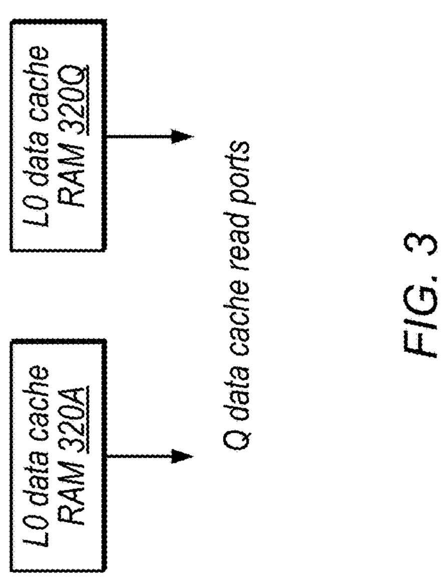

FIG. 3 is a block diagram illustrating example source resources, according to some embodiments. In the illustrated example, a computing system includes operand cache 310, L0 data cache RAMs 320A-320Q, and operand cache 330. These example resources are included for purposes of explanation but are not intended to limit the scope of this disclosure. Rather, illustrated resources may be omitted, other resources may be included, disclosed resources may be configured differently, etc. in other embodiments.

Operand cache 310, in some embodiments, is configured to store operand data and may be the closest level of data caching to the execution pipelines (e.g., at a lower level than the register file or L0 cache). In the illustrated example, operand cache 310 implements N read ports and is configured to provide M sources per read port (e.g., where M may correspond to the number of threads in a SIMT group).

Operand cache 330, in some embodiments, is configured to store operand data as well as operand cache 310. In some embodiments, operand cache 310 is a dirty operand cache and operand cache 330 is a read-only operand cache. In the illustrated example, operand cache 330 includes P read ports, one of which is dedicated for S0 sources (e.g., where a given instruction may include one or more sources starting with S0 and followed by S1, etc. if utilizing additional sources).

In some embodiments, hardware is configured to dynamically manage operand caches (e.g., to properly handle hits and misses, make allocation and eviction decisions, etc.). Operand cache control circuitry may implement lock techniques to keep register data available in an operand cache by preventing eviction of the data until it has been used. (Similar techniques may be used at various cache levels, including the data L0 cache, etc.). The control circuitry may unlock cache entries in response to reset events (e.g., based on an instruction moving past the source capture stage, etc.). Granular source resource arbitration may be particularly advantageous in this context of large, dynamically managed operand caches, e.g., to allow faster unlocking of operand cache entries in contrast to waiting for all sources to be available before accessing any sources for an instruction.

The L0 data cache, in the illustrated example, includes multiple random-access memories (RAMs), each with one read port. The L0 cache may store only register data. In other embodiments, the system may implement a traditional register file instead of an L0 data cache. Note that arbitration for a given cache level may consider whether data is actually resident in that cache level, in some embodiments (or threads may not be allowed to arbitrate until their data is filled and available at that cache level). In some embodiments, arbitrated source resources may include multiple data cache or memory levels (e.g., the L0 data cache 320 may fill data from an L1 cache, L2 cache, system memory, etc.).

In some embodiments, circuitry configured to store uniform data (e.g., global variables bound to a GPU buffer) for graphics processor is another source resource type (not explicitly shown).

Note that one or more source resources may not be arbitrated. For example, forwarded results may be available on a bus for use by any instruction and may not be arbitrated. Further note that requests for the illustrated resources may come from other pipelines with other sets of execution slots. For example, multiple pipelines instances may be included in a given processor, each with its own set of SIMT slots. In these embodiments, the per-resources arbitration circuitry may arbitrate among SIMT slots from multiple such pipelines.

Example Multi-buffering of Source Requests

Figure 4:
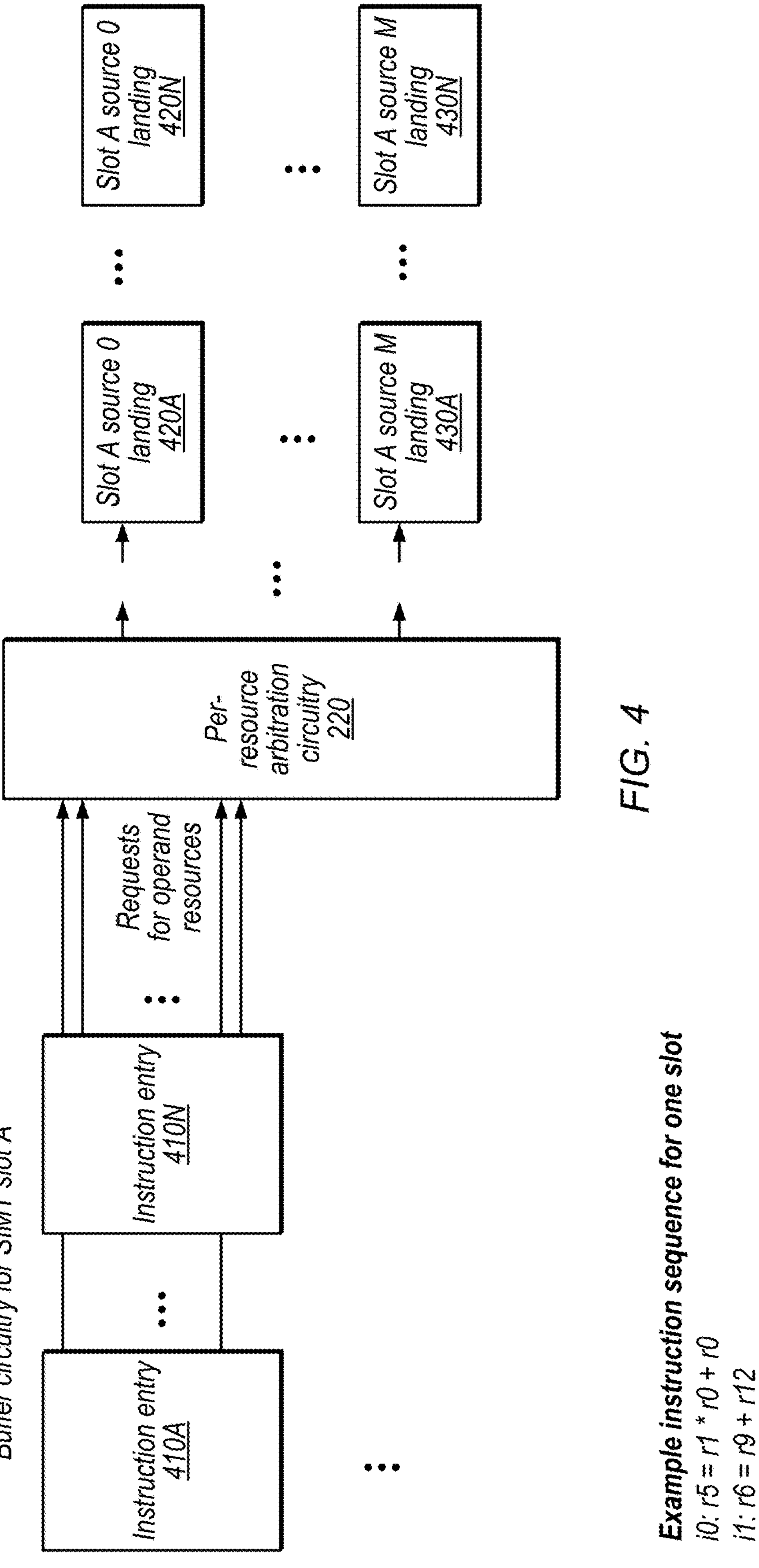
FIG. 4 is a block diagram illustrating example multi-instruction buffering and corresponding source landing circuitry, according to some embodiments.

FIG. 4 is a block diagram illustrating example circuitry configured to buffer requests for multiple instructions of a given SIMT slot for arbitration, according to some embodiments. In the illustrated example, multiple instruction entries 410A-410N store requests for operand resources and multiple source landing entries 420A-420N and 430A-430N store retrieved operand data (e.g., while waiting for other operand data for a given instruction). In the illustrated example, multiple instructions from the same SIMT slot are buffered, but similar techniques may be used for instructions of a single thread, in other embodiments.

Consider the example instruction sequence for slot A shown in FIG. 4. In this example, instruction i0 utilizes source registers r0 and r1 and stores its result in register r5 while instruction i1 utilizes sources r9 and r12 and stores its result in r6. The buffer circuitry with instruction entries 410 may store instruction in program order, e.g., with older instructions prioritized for arbitration. Once an older instruction wins arbitration for a given source resource, however, (or if the older instruction does not utilize a given source resource) other instructions in entries 410 may also be considered in arbitration. For example, if instruction i0 wins arbitration for r0 from an operand cache but is still waiting for r1, instruction i1 may be allowed to request one if its source operations (e.g., a request for r9 from the operand cache). Generally, this may provide more efficient use of the pipeline by providing additional requests to be considered to arbitration (e.g., relative to implementations that allow only a single instruction per slot to send requests for its sources).

Further, in the illustrated example, landing circuitry 420A-420N and 430A-430N includes storage to store winning operands for multiple entries 410. For example, circuitry 420A-420N may provide landing storage for sources of SIMT slot A while circuitry 430A-430N may provide landing storage for another SIMT slot. This may allow storage of source operands for multiple buffered instructions while waiting for instruction release. The techniques of FIG. 4 may be particularly advantageous in workloads with sequences of the same type of instruction, for example.

Note that various disclosed techniques may also be utilized in non-SIMT embodiments. In these embodiments, the slots may be per-thread rather than per-SIMT group and an instruction from a given thread may trigger source capture command(s) prior to winning arbitration for all of that instruction's source operands.

Example Multi-stage Arbitration

Figure 5:
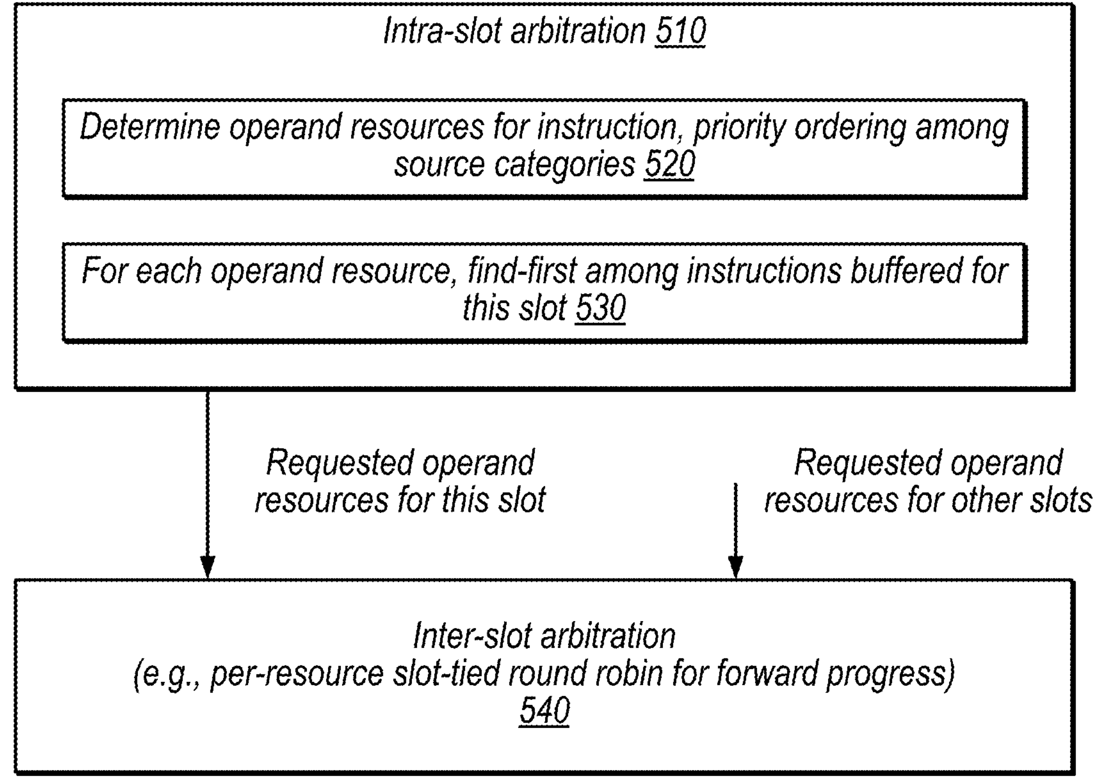
FIG. 5 is a flow diagram illustrating example inter-slot and intra-slot arbitration, according to some embodiments.

FIG. 5 is a flow diagram illustrating example inter-slot and intra-slot arbitration, according to some embodiments. In the illustrated example, the system includes multiple arbitration stages, first within a SIMT slot and then among SIMT slots.

At 510, in the illustrated example, the system performs intra-slot arbitration 510, e.g., within a given SIMT execution slot 210. In the illustrated example, this includes elements 520 and 530.

At 520, the system determines operand resources for an instruction of a given slot, according to a priority ordering among source categories. For example, the various different source types of the system may be assigned a priority from highest to lowest priority. Element 520 may determine which resource is able to provide operand data for each source of the instruction. For example, typically forwarded results are most readily available and highest priority, followed by operand caches, while longer-latency data caches would be lower priority. Element 520 may also consider GPR matches within an instruction (e.g., two sources that use r0) and use a driver/passenger arrangement such that only one of the sources participates in arbitration and the other(s) borrow the result.

At 530, the system utilizes a find-first scheme among instructions buffered for a given slot (e.g., in circuitry 410A-410N), for each operand resource, to select a candidate for that operand resource. Note that a resource may be a port of a multi-ported structure or a bank of a multi-banked structure, in this example. If a slot does not have any instructions with sources that target a given resource, that slot may not arbitrate for that resource (although multi-instruction buffering may reduce the likelihood of this scenario).

At 540, in the illustrated example, the system performs intra-slot arbitration. In some embodiments, this is a per-resource slot-tied round robin scheme, which may provide forward progress. In this process, the candidates selected at element 530 are arbitrated using a round robin technique (e.g., where each slot has a priority value for a given arbitration round, and the priorities change each round according to a round robin scheme. The particular multi-stage approach of FIG. 5 may reduce arbiter complexity relative to single-stage approaches, but various other arbitration techniques are contemplated.

Example Method

Figure 6:
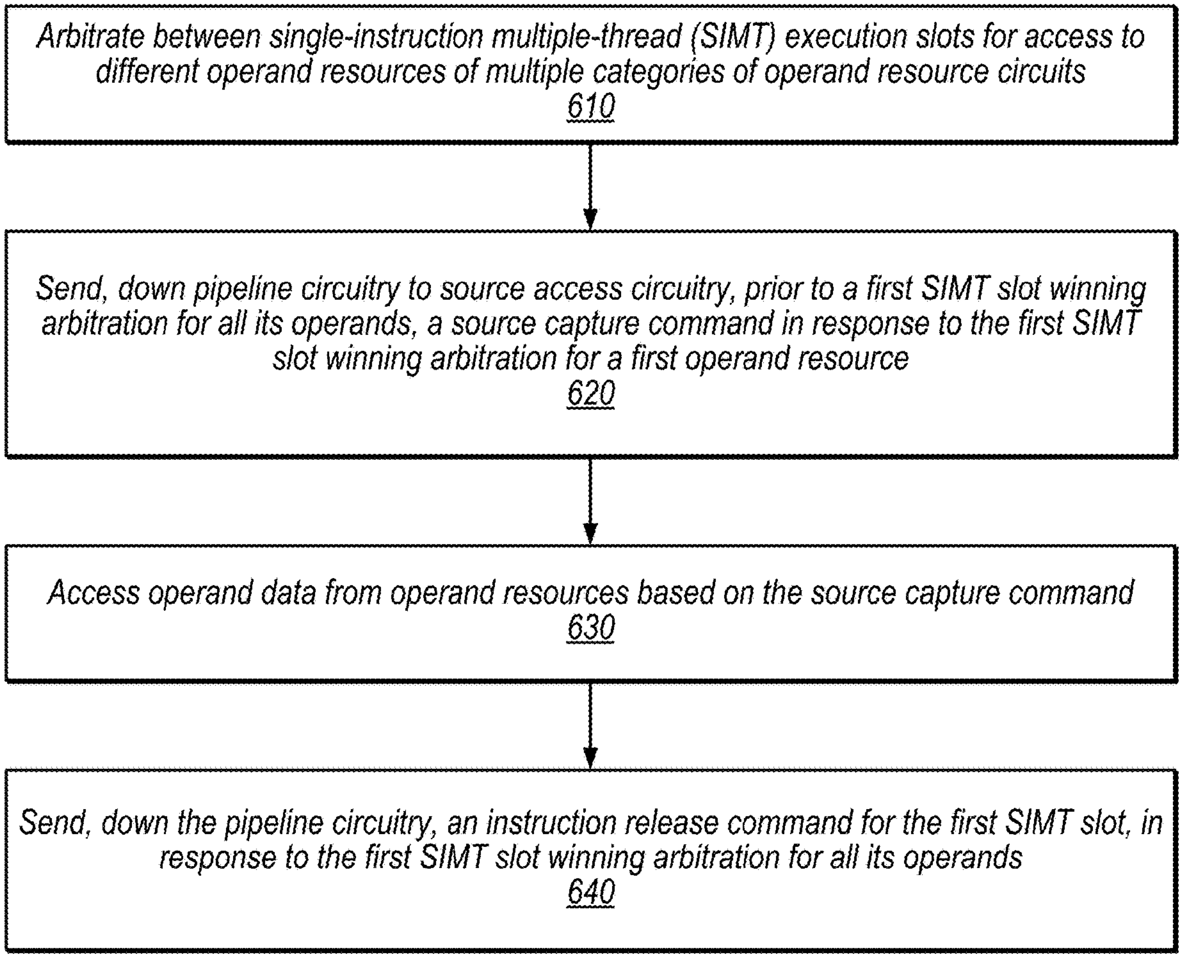
FIG. 6 is a flow diagram illustrating an example method, according to some embodiments.

FIG. 6 is a flow diagram illustrating an example method, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, the computing system arbitrates between single-instruction multiple-thread (SIMT) execution slots for access to different operand resources of multiple categories of operand resource circuits. The system may include processor pipeline circuitry and multiple categories of operand resource circuits configured to provide operands for instructions executed by the processor pipeline circuitry. In some embodiments, the pipeline circuitry includes multiple pipelines that each include multiple SIMT slots and the per-resource arbitration circuitry is configured to arbitrate among SIMT slots from multiple pipelines.

At 620, in the illustrated embodiment, the computing system sends, down pipeline circuitry of the computing system to source access circuitry of the computing system, prior to a first SIMT slot winning arbitration for all its operands, a source capture command in response to the first SIMT slot winning arbitration for a first operand resource.

At 630, in the illustrated embodiment, the computing system accesses operand data from operand resources based on the source capture command.

At 640, in the illustrated embodiment, the computing system sends, down pipeline circuitry of the computing system to the source access circuitry, an instruction release command for the first SIMT slot, in response to the first SIMT slot winning arbitration for all its operands.

In some embodiments, the system includes a source landing stage configured to buffer accessed operand data from the source access circuitry, for the first SIMT group, prior to the instruction release command.

In some embodiments, the operand resources include: multiple operand cache read ports, multiple data cache read ports, and uniform storage circuitry.

In some embodiments, the system includes first-stage scheduler circuitry configured to arbitrate among SIMT groups to assign SIMT groups to SIMT execution slots and second-stage scheduling circuitry configured to arbitrate among SIMT execution slots for assignment to execution resources, wherein the second-stage scheduler circuitry includes the per-resource arbitration circuitry.

In some embodiments, the system includes buffer circuitry configured to buffer multiple instructions per SIMT slot and provide a next instruction for arbitration for an operand resource in a next cycle subsequent to another instruction from the same SIMT slot winning arbitration for the operand resource. In some embodiments, the system includes landing buffer circuitry configured to buffer operand data retrieved for the multiple instructions per SIMT slot.

In some embodiments, the operand resources include one or more operand caches that are dynamically managed by hardware. Control circuitry may lock a given entry in at least one of the one or more operand caches in response to a hit for the given entry and determine to unlock the given entry in response to an unlock event.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Example Device

Figure 7:
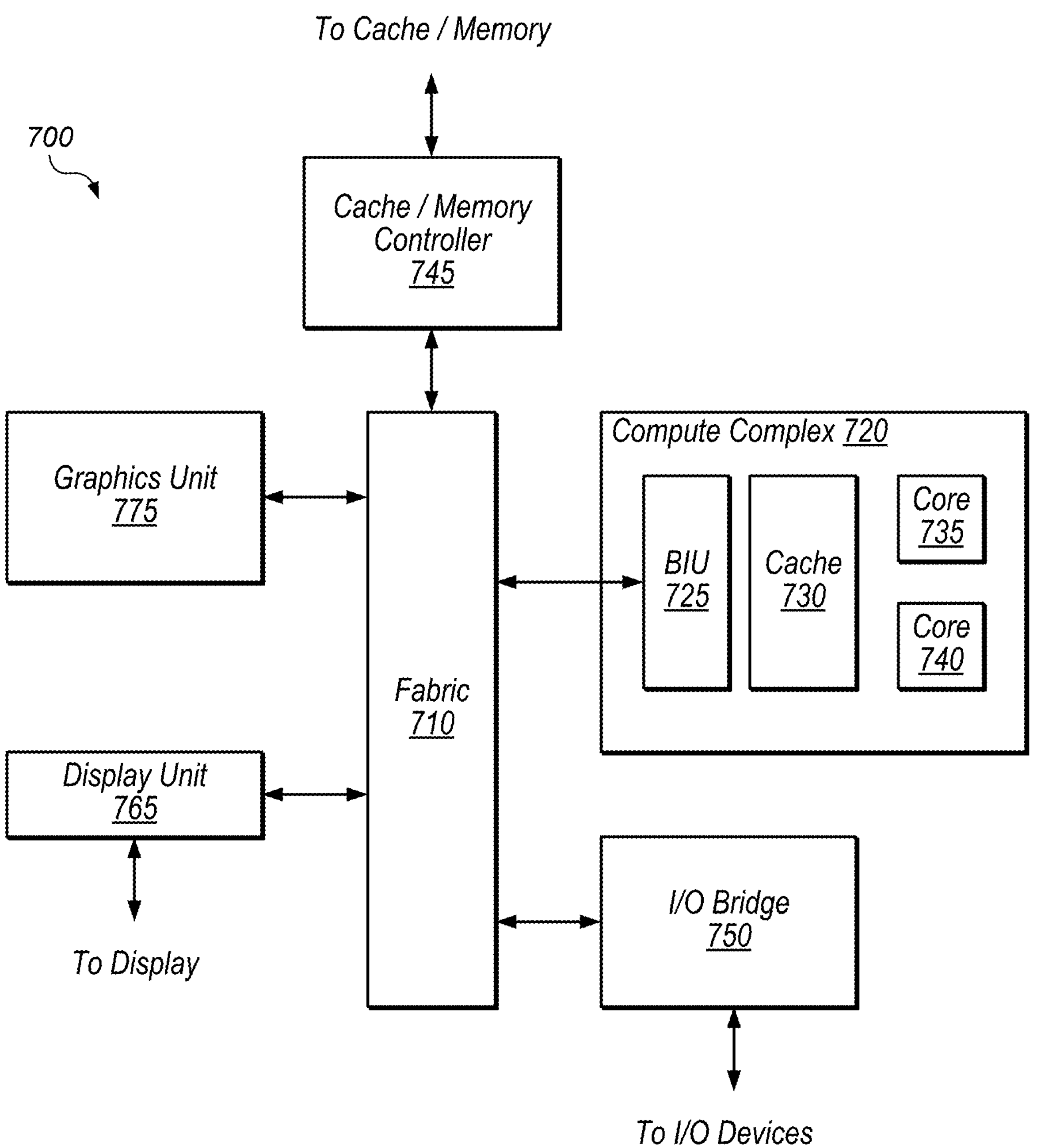
FIG. 7 is a block diagram illustrating an example computing device, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions. These instructions may be stored in computer readable medium such as a memory coupled to memory controller 745 discussed below.

In some embodiments, one or more processors cores of complex 720 advantageously implement disclosed greedy read scheduling techniques.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches. Memory coupled to controller 745 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 745 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 720 to cause the computing device to perform functionality described herein.

Graphics unit 775 may include one or more processors, e.g., one or more graphics processing units (GPUs). Graphics unit 775 may receive graphics-oriented instructions, such as OPENGL®, Metal®, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

In some embodiments, one or more processors cores of graphics unit 775 advantageously implement disclosed greedy read scheduling techniques.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 700 with connectivity to various types of other devices and networks.

Example Applications

Figure 8:
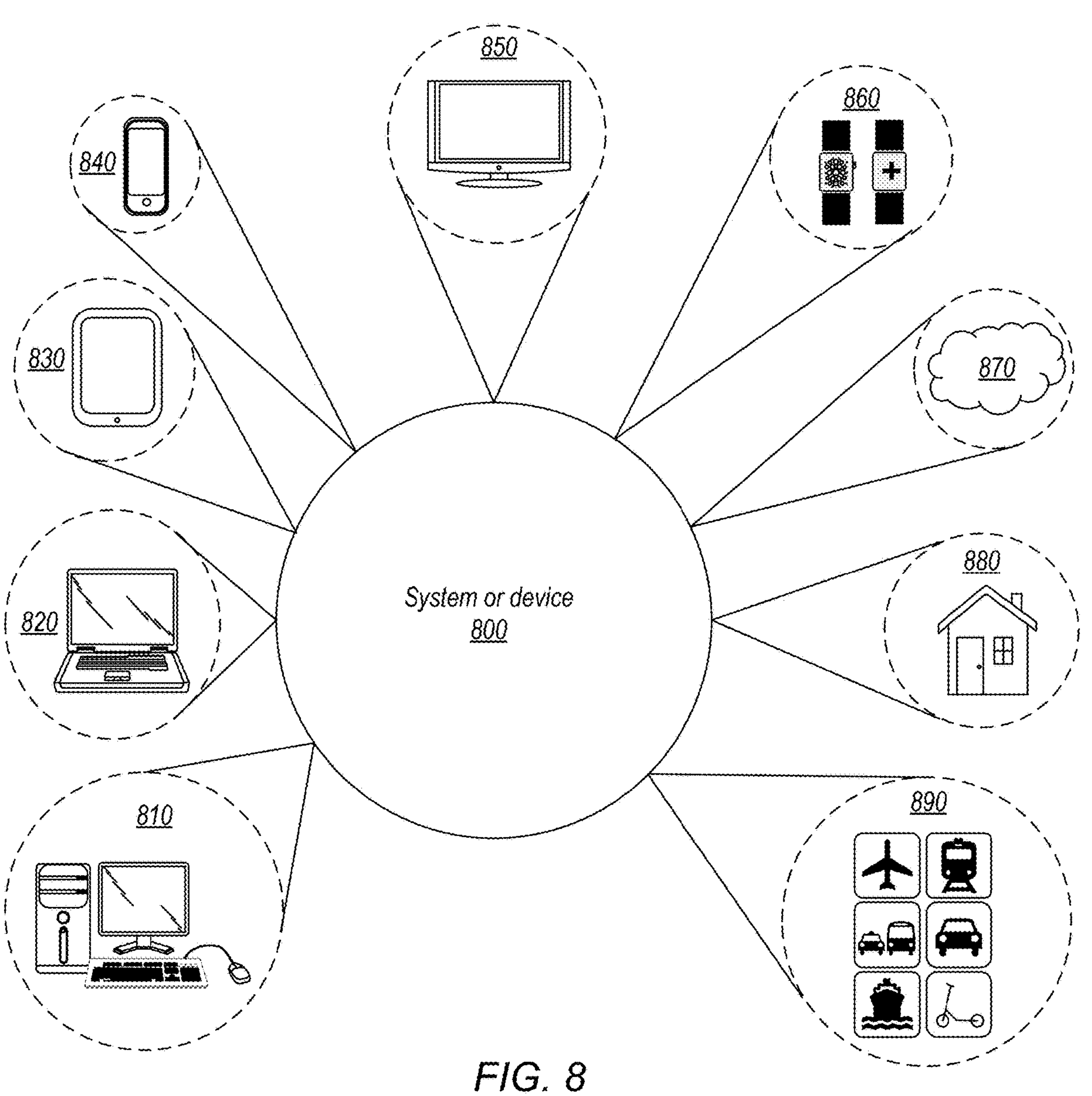
FIG. 8 is a diagram illustrating example applications of disclosed systems and devices, according to some embodiments.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 9:
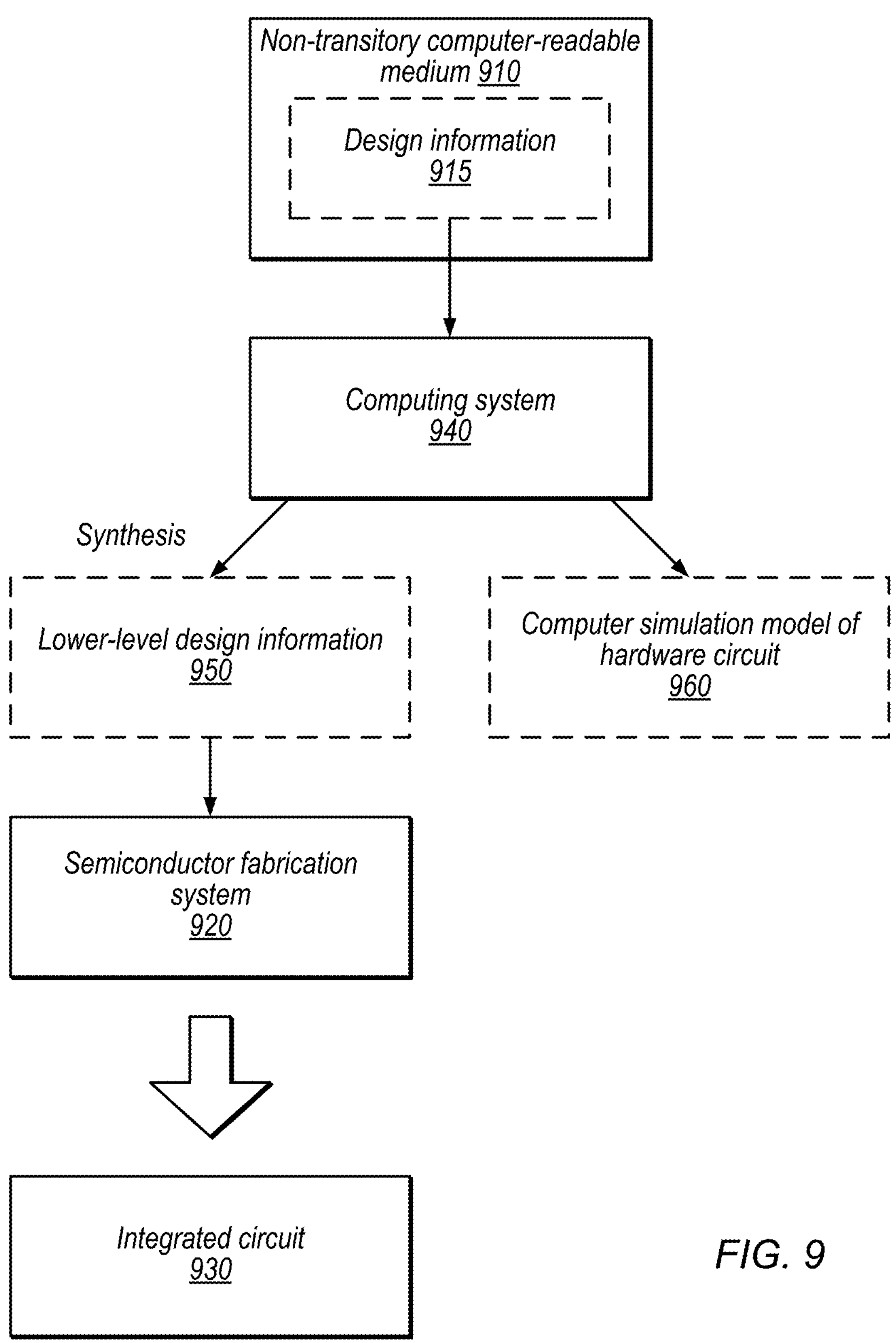
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment, computing system 940 is configured to process the design information. This may include executing instructions included in the design information, interpreting instructions included in the design information, compiling, transforming, or otherwise updating the design information, etc. Therefore, the design information controls computing system 940 (e.g., by programming computing system 940) to perform various operations discussed below, in some embodiments.

In the illustrated example, computing system 940 processes the design information to generate both a computer simulation model of a hardware circuit 960 and lower-level design information 950. In other embodiments, computing system 940 may generate only one of these outputs, may generate other outputs based on the design information, or both. Regarding the computing simulation, computing system 940 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 940 also processes the design information to generate lower-level design information 950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 950 (potentially among other inputs), semiconductor fabrication system 920 is configured to fabricate an integrated circuit 930 (which may correspond to functionality of the simulation model 960). Note that computing system 940 may generate different simulation models based on design information at various levels of description, including information 950, 915, and so on. The data representing design information 950 and model 960 may be stored on medium 910 or on one or more other media.

In some embodiments, the lower-level design information 950 controls (e.g., programs) the semiconductor fabrication system 920 to fabricate the integrated circuit 930. Thus, when processed by the fabrication system, the design information may program the fabrication system to fabricate a circuit that includes various circuitry disclosed herein.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Accordingly, non-transitory computer-readable storage medium 910 may include two or more memory media; such media may reside in different locations—for example, in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 940, semiconductor fabrication system 920, or both. In some embodiments, design information may also include one or more cell libraries that specify the synthesis, layout, or both of integrated circuit 930. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 930 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 and model 960 are configured to operate according to a circuit design specified by design information 915, which may include performing any of the functionality described herein. For example, integrated circuit 930 may include any of various elements shown in FIGS. 1B and 2-4. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 920 to fabricate integrated circuit 930.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:

processor pipeline circuitry;

first and second categories of operand resource circuits configured to provide operand data for instructions to be executed by the processor pipeline circuitry;

wherein the processor pipeline circuitry includes:

first resource arbitration circuitry configured to arbitrate between instructions of single-instruction multiple-thread (SIMT) groups for access to the first operand resource category;

second resource arbitration circuitry configured to arbitrate between SIMT groups for access to the second operand resource category;

source access circuitry configured to access the operand data from the operand resource circuits based on source capture commands; and source control circuitry configured to, prior to an instruction of a first SIMT group winning arbitration for all its operands and in response the instruction winning arbitration at the first resource arbitration circuitry for a first operand resource of the operand resource circuits, send a source capture command to the source access circuitry to access operand data from the first operand resource for the instruction; and instruction control circuitry configured to generate an instruction release command for the instruction, in response to the instruction winning arbitration for all its operands, including at the second resource arbitration circuitry.

2. The apparatus of claim 1, wherein the processor pipeline circuitry further includes:

a source landing stage configured to buffer accessed operand data from the source access circuitry, for the instruction of the first SIMT group, prior to the instruction release command.

3. The apparatus of claim 1, wherein the operand resource circuits include:

multiple operand cache read ports;

multiple data cache read ports; and uniform storage circuitry.

4. The apparatus of claim 1, wherein the first resource arbitration circuitry implements a different arbitration scheme than the second resource arbitration circuitry.

5. The apparatus of claim 1, wherein:

the processor pipeline circuitry includes multiple pipelines that each include multiple SIMT slots; and the first resource arbitration circuitry is configured to arbitrate among instructions of SIMT groups from multiple pipelines.

6. The apparatus of claim 1, further comprising:

first-stage scheduler circuitry configured to arbitrate among SIMT groups to assign SIMT groups to SIMT execution slots; and second-stage scheduling circuitry configured to arbitrate among instructions in SIMT execution slots for assignment to execution resources, wherein the second-stage scheduler circuitry includes the first resource arbitration circuitry.

7. The apparatus of claim 1, further comprising:

buffer circuitry configured to:

buffer multiple instructions per SIMT group; and provide a next instruction for arbitration for an operand resource in a next cycle subsequent to another instruction from the same SIMT group winning arbitration for the operand resource; and landing buffer circuitry configured to buffer operand data retrieved for the multiple instructions per SIMT group.

8. The apparatus of claim 1, wherein:

the operand resource circuits include one or more operand caches that are dynamically managed by hardware; and control circuitry is configured to:

lock a given entry in at least one of the one or more operand caches in response to a hit for the given entry; and determine to unlock the given entry in response to an unlock event.

9. The apparatus of claim 1, further comprising:

fixed-function circuitry configured to control the processor pipeline circuitry to perform operations for at least one of the following types of programs:

graphics shader programs; and machine learning programs.

10. The apparatus of claim 1, wherein the apparatus is a computing device that further includes:

a display; and network interface circuitry.

11. A method, comprising:

arbitrating, by a computing system, between instructions of single-instruction multiple-thread (SIMT) execution groups for access to a first operand resource category;

arbitrating, by the computing system, between instructions of SIMT groups for access to a second operand resource category;

sending, by the computing system down pipeline circuitry of the computing system to source access circuitry of the computing system, prior to an instruction of a first SIMT slot winning arbitration for all its operands, a source capture command in response to the instruction winning arbitration for a first operand resource; and accessing, by the source access circuitry, operand data from one or more operand resources based on the source capture command; and generating, by the computing system subsequent to the accessing, an instruction release command for the instruction, in response to the instruction winning arbitration for all its operands.

12. The method of claim 11, further comprising:

buffering, by the computing system, accessed operand data from the source access circuitry, for the instruction of the first SIMT slot, prior to the instruction release command.

13. The method of claim 11, wherein the operand resources include:

multiple operand cache read ports; and multiple data cache read ports.

14. The method of claim 11, wherein the arbitrating applies different arbitration schemes for different categories of operand resource circuits.

15. The method of claim 11, wherein:

the pipeline circuitry includes multiple pipelines that each include multiple SIMT slots; and the arbitrating includes arbitrating among SIMT slots from multiple pipelines.

16. The method of claim 15, further comprising:

arbitrating among SIMT groups to assign SIMT groups to SIMT execution slots.

17. The method of claim 11, further comprising:

buffering, by the computing system, multiple instructions per SIMT slot; and providing, by the computing system, a next instruction for arbitration for an operand resource in a next cycle subsequent to another instruction from the same SIMT slot winning arbitration for the operand resource; and buffering, by the computing system, operand data retrieved for the multiple instructions per SIMT slot.

18. The method of claim 11, wherein the operand resources include one or more operand caches that are dynamically managed by hardware, the method further comprising:

locking a given entry in at least one of the one or more operand caches in response to a hit for the given entry; and determining to unlock the given entry in response to an unlock event.

19. A non-transitory computer-readable medium having instructions of a hardware description programming language stored thereon that, when processed by a computing system, program the computing system to generate a computer simulation model, wherein the model represents a hardware circuit that includes:

processor pipeline circuitry;

multiple first and second categories of operand resource circuits configured to provide operand data for instructions to be executed by the processor pipeline circuitry;

wherein the processor pipeline circuitry includes:

first resource arbitration circuitry configured to arbitrate between instructions of single-instruction multiple-thread (SIMT) groups for access to the first operand resource category;

second resource arbitration circuitry configured to arbitrate between SIMT groups for access to the second operand resource category;

source access circuitry configured to access the operand data from the operand resources based on source capture commands; and source control circuitry configured to, prior to an instruction of a first SIMT group winning arbitration for all its operands and in response the instruction winning arbitration at the first resource arbitration circuitry for a first operand resource of the operand resource circuits, send a source capture command to the source access circuitry to access operand data from the first operand resource for the instruction; and instruction control circuitry configured to generate an instruction release command for the instruction first SIMT group, in response to the instruction winning arbitration for all its operands, including at the second resource arbitration circuitry.

20. The non-transitory computer-readable medium of claim 19, wherein the processor pipeline circuitry further includes:

a source landing stage configured to buffer accessed operand data from the source access circuitry, for the instruction of the first SIMT group, prior to the instruction release command.

* * * * *